United States Patent
Ishizawa et al.

(10) Patent No.: US 7,484,033 B2
(45) Date of Patent: Jan. 27, 2009

(54) COMMUNICATION SYSTEM USING PCI-EXPRESS AND COMMUNICATION METHOD FOR PLURALITY OF NODES CONNECTED THROUGH A PCI-EXPRESS

(75) Inventors: Hiroshi Ishizawa, Kawasaki (JP); Terumasa Haneda, Kawasaki (JP); Yuichi Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 422 days.

(21) Appl. No.: 11/359,580

(22) Filed: Feb. 23, 2006

(65) Prior Publication Data

US 2006/0218336 A1 Sep. 28, 2006

(30) Foreign Application Priority Data

Mar. 24, 2005 (JP) ............................. 2005-085307
Nov. 30, 2005 (JP) ............................. 2005-345822

(51) Int. Cl.
*G06F 13/00* (2006.01)
(52) U.S. Cl. .......................... 710/316; 710/316; 710/7; 710/20; 710/37
(58) Field of Classification Search ......... 710/316–317, 710/36–42, 29, 7, 20, 37
See application file for complete search history.

(56) References Cited

U.S. PATENT DOCUMENTS 6,874,042 B2 3/2005 Sauber
6,928,126 B2 * 8/2005 Ono et al. .................... 375/359
6,971,098 B2 * 11/2005 Khare et al. ................. 718/101
7,058,738 B2 6/2006 Stufflebeam, Jr.

(Continued)

FOREIGN PATENT DOCUMENTS

JP 2001-142845 5/2001

(Continued)

OTHER PUBLICATIONS

Second Notification of Office Action issued on Feb. 1, 2008 by the State Intellectual Property Office of China in the corresponding Chinese Patent Application No. 200610066121.1 (4 pages) (English translation consisting of 4 pages including the Text of the Second Office Action).

(Continued)

*Primary Examiner*—Raymond N Phan
(74) *Attorney, Agent, or Firm*—Staas & Halsey LLP

(57) ABSTRACT

To be able to transmit a response packet to a target, which is the original request source node, even if, after issuing a request from a node to another, a bus ID/a device ID is replaced in the PCI-Express switch before said another node makes a response to the request source node in a PCI-Express communication system, which uses a PCI-Express switch. For that purpose, a unique node ID for indicating each node is set to the nodes, a channel ID is set to each channel used for data transfer, and the node ID of the transfer destination module, the channel ID of a channel used for the data transfer, and the packet type indicating that the packet is a request or a response are set in an address field of a packet of data transfer. For the data transfer, only a memory write request packet routed by address routing is used.

17 Claims, 18 Drawing Sheets

U.S. PATENT DOCUMENTS

| | | | |
|---|---|---|---|
| 7,165,131 | B2 | 1/2007 | Creta et al. |
| 7,191,255 | B2 | 3/2007 | Wong et al. |
| 7,293,127 | B2 | 11/2007 | Caruk |
| 7,340,555 | B2 | 3/2008 | Ashmore et al. |
| 7,380,018 | B2 | 5/2008 | Moll |
| 2004/0210754 | A1 | 10/2004 | Barron et al. |
| 2005/0034045 | A1 | 2/2005 | Lueck et al. |
| 2005/0289306 | A1* | 12/2005 | Muthrasanallur et al. ... 711/158 |
| 2006/0179195 | A1 | 8/2006 | Sharma et al. |
| 2006/0195644 | A1 | 8/2006 | Arndt et al. |
| 2006/0206655 | A1 | 9/2006 | Chappell et al. |
| 2007/0130397 | A1* | 6/2007 | Tsu .............................. 710/62 |
| 2008/0055808 | A1* | 3/2008 | Burkland et al. .............. 361/94 |

FOREIGN PATENT DOCUMENTS

JP      2004-326151      11/2004

OTHER PUBLICATIONS

First Notification of Office Action issued by the State Intellectual Property Office of China on Sep. 7, 2007 in the corresponding Chinese Patent Application No. 200610066121.1 (4 pages) (English translation including the Text of the First Office Action consisting of 6 pages).

Third Notification of Office Action issued by the State Intellectual Property Office of China on Jul. 4, 2008 in corresponding Chinese Patent Application No. 200610066121.1, including the Text of the Third Office Action (4 pages with 4 additional pages of English translation).

* cited by examiner

|  | +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|---|
|  | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Byte 0 | R | Fmt | | | Type | | | | R | TC | | | R | | | | TD | EP | Attr | | R | | | | Length | | | | | | | |
| Byte 4 | Request ID | | | | | | | | | | | | | | | Tag | | | | | | | | Last DW BE | | | | 1st DW BE | | | |
|  | Bus Number | | | | | | | | Device Number | | | | | Function Number | | | | | | | | | | | | | | | | | | |
| Byte 8 | Address [63:32] | | | | | | | | | | | | | | | | | | | | | | | | | | | | | | | |
| Byte 12 | Address [31:2] | | | | | | | | | | | | | | | | | | | | | | | | | | | | | | R | |

F I G. 4   PRIOR ART

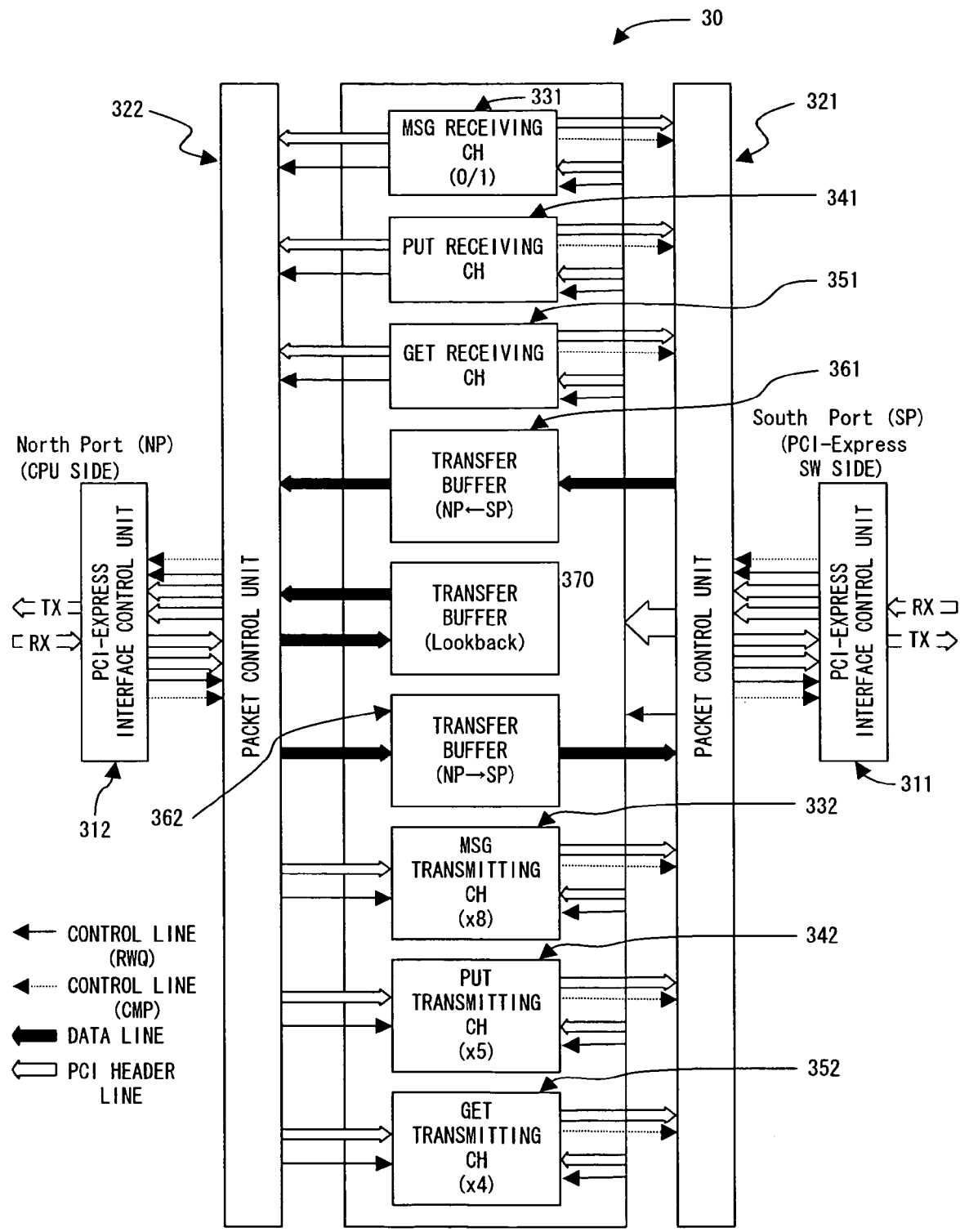
F I G. 11

| | | | | | |
|---|---|---|---|---|---|
| 0x00 | : Reserved | 0x10 | : MSG TRANSMITTING CH0 | 0x20 | : Reserved | 0x30 | : MSG RECEIVING CH0 |
| 0x01 | : Reserved | 0x11 | : MSG TRANSMITTING CH1 | 0x21 | : Reserved | 0x31 | : MSG RECEIVING CH1 |
| 0x02 | : Reserved | 0x12 | : MSG TRANSMITTING CH2 | 0x22 | : Reserved | 0x32 | : Reserved |
| 0x03 | : Reserved | 0x13 | : MSG TRANSMITTING CH3 | 0x23 | : Reserved | 0x33 | : Reserved |
| 0x04 | : Reserved | 0x14 | : MSG TRANSMITTING CH4 | 0x24 | : Reserved | 0x34 | : Reserved |
| 0x05 | : Reserved | 0x15 | : MSG TRANSMITTING CH5 | 0x25 | : Reserved | 0x35 | : Reserved |
| 0x06 | : Reserved | 0x16 | : MSG TRANSMITTING CH6 | 0x26 | : Reserved | 0x36 | : Reserved |
| 0x07 | : Reserved | 0x17 | : MSG TRANSMITTING CH7 | 0x27 | : Reserved | 0x37 | : Reserved |
| 0x08 | : PUT TRANSMITTING CH0 | 0x18 | : GET RECEIVING CH(1st) | 0x28 | : GET TRANSMITTING CH0 | 0x38 | : PUT RECEIVING CH(1st) |
| 0x09 | : PUT TRANSMITTING CH1 | 0x19 | : GET RECEIVING CH(2nd) | 0x29 | : GET TRANSMITTING CH1 | 0x39 | : PUT RECEIVING CH(2nd) |
| 0x0a | : PUT TRANSMITTING CH2 | 0x1a | : GET RECEIVING CH(3rd) | 0x2a | : GET TRANSMITTING CH2 | 0x3a | : PUT RECEIVING CH(3rd) |
| 0x0b | : PUT TRANSMITTING CH3 | 0x1b | : GET RECEIVING CH(4th) | 0x2b | : GET TRANSMITTING CH3 | 0x3b | : PUT RECEIVING CH(4th) |
| 0x0c | : Reserved | 0x1c | : GET RECEIVING CH(5th) | 0x2c | : Reserved | 0x3c | : PUT RECEIVING CH(5th) |
| 0x0d | : Reserved | 0x1d | : GET RECEIVING CH(6th) | 0x2d | : Reserved | 0x3d | : PUT RECEIVING CH(6th) |
| 0x0e | : Reserved | 0x1e | : GET RECEIVING CH(7th) | 0x2e | : Reserved | 0x3e | : PUT RECEIVING CH(7th) |
| 0x0f | : PUT TRANSMITTING CH4 | 0x1f | : GET RECEIVING CH(8th) | 0x2f | : Reserved | 0x3f | : PUT RECEIVING CH(8th) |
| | | | | | | 0x40~ | : Reserved |

FIG. 12

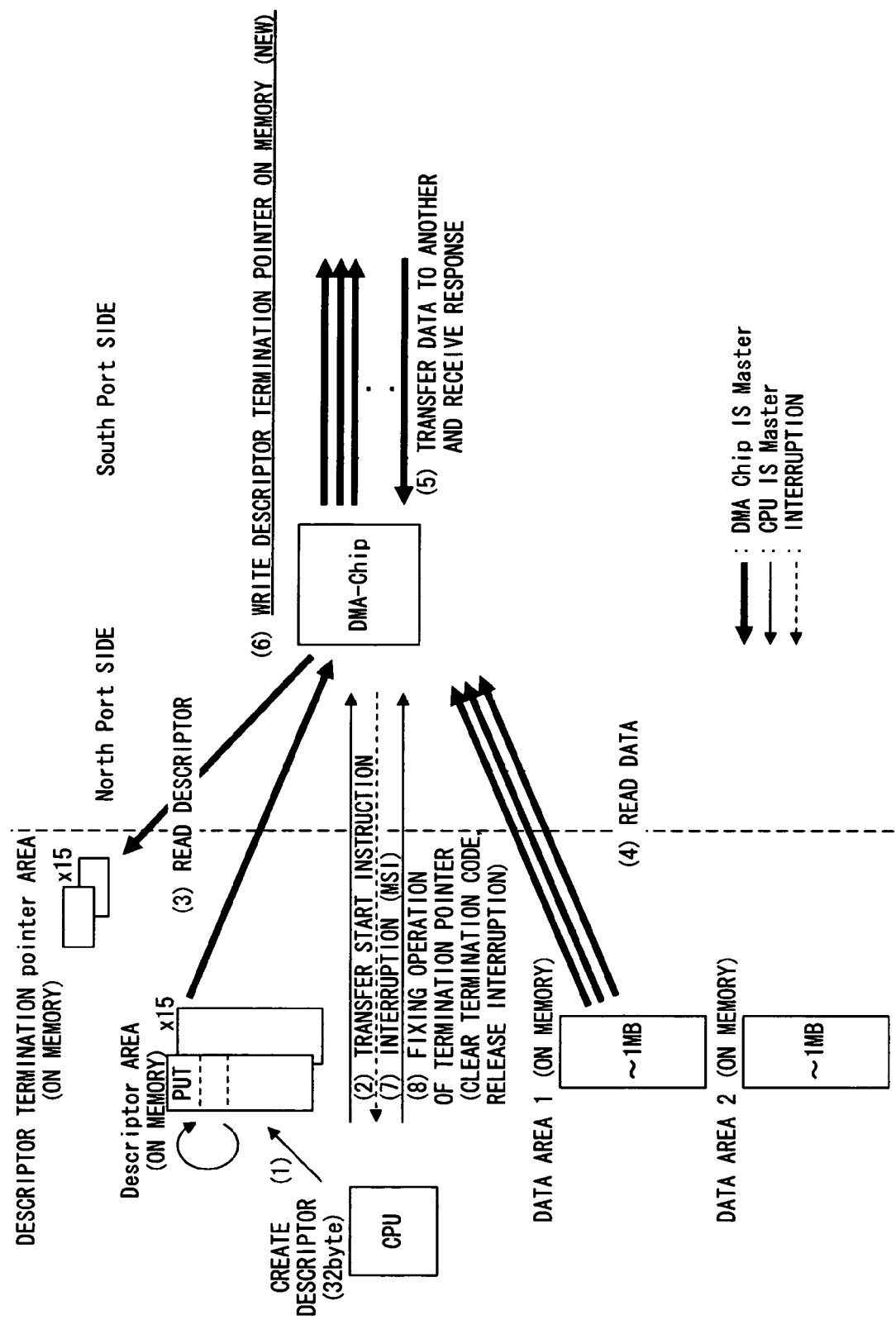
F I G. 14

COMMUNICATION SYSTEM USING PCI-EXPRESS AND COMMUNICATION METHOD FOR PLURALITY OF NODES CONNECTED THROUGH A PCI-EXPRESS

CROSS-REFERENCE TO RELATED APPLICATIONS

This application is based upon and claims the benefit of priority from the prior Japanese Patent Application No. 2005-85307 filed on Mar. 24, 2005 and the prior Japanese Patent Application No. 2005-345822 filed on Nov. 30, 2005, the entire contents of which are incorporated herein by reference.

BACKGROUND OF THE INVENTION

1. Field of the Invention

The present invention relates to a communication system and communication method thereof, with PCI-Express used in an interface, and with a plurality of nodes connected through a PCI-Express.

2. Description of the Related Art

Peripheral Component Interconnect (PCI) is a standard for computer bus connecting between each part inside computers, and is currently applied to most of computers; however, specification of PCI-Express, which is faster transfer interface standards, is newly developed.

For example, as described in Patent Document 1, in the PCI-Express, in order to prevent skews between signal lines, which occur in a parallel bus, a serial link is applied, and packets are transferred asynchronously through the serial link. Also, the PCI-Express allows upgrade in units of layers, and therefore functions thereof are layered. By adding a header in a transaction layer to transmission data produced in number and a CRC are added to the head and the tail of the transaction packet, generating a data link packet. Finally, in the physical layer, it is converted to physical signals and transmitted through a transmission media.

Meanwhile, in the PCI-Express, between nodes can be connected by a switch (PCI-Express switch).

FIG. 1 is a diagram explaining the conventional PCI-Express communication system with each node (also referred to as a module herein) connected by the PCI-Express switch performing communication between modules A-n based on the PCI-Express specification.

In the following description, a part of the PCI-Express relating to the present invention is further explained.

According to the PCI-Express specification, a module, called a root complex, which is located on top of the upper layer, such as a module A(1) in FIG. 1 is required. Also, as shown in FIG. 1, each module has been assigned a bus number (BusNum.) and a device number (DeviceNum.) in each port of the PCI-Express switch (6). FIG. 1 shows an example that the module A(1) has the bus number of 0 and the device number of 1 assigned, a module B(2) has the bus number of 1 and the device number of 1 assigned, a module C(3) has the bus number of 1 and the device number of 3 assigned, and a module D (4) has the bus number of 1 and the device number of 4.

Next, packet communications between modules via the PCI-Express switch (6) is explained.

There are two types of packet routing on top of the PCI-Express switch (6); address routing for routing according to an address comprised in a packet header, and ID routing for routing according to a requester ID constituted from device and action numbers, comprised in a packet header.

These two types of routing, in the PCI-Express specification, are separately used so that address routing is used for a request packet, and the ID routing is used for a response packet. Therefore, the address routing is used for a request packet for a memory write request command and a memory read request command. Note that a response by a response packet is not made to the memory write request command in this PCI-Express specification.

As shown in FIG. 1, (1) when a memory read request command is issued from the module D(4) and the module C(3), (2) the PCI-Express switch (6) transfers a memory read request packet to the module C(3) according to the address routing of the PCI-Express specification, (3)the module C(3) responds read data as a response packet. (4) The PCI-Express switch (6) transfers the response packet to the module D(4) according to the ID routing of the PCI-Express specification.

FIG. 2 is a flow diagram explaining a GET transfer sequence, which reads out data from another end. Firmware in transmitting side starts up hardware in the transmitting side by generating a descriptor, which is for specifying data to be read out, in the memory. As shown in FIG. 2, transmitting side or transmitting source issues a memory read request packet as a GET transfer sequence, and transmits the GET transfer request to the receiving side according to address routing of the PCI-Express specification in the PCI-Express switch (6). In the receiving side, hardware in the receiving side starts up from the idle state by a receive-trigger of the receiving transmitted from the transmitting side. And after reading out data from the memory, a response to the GET request is returned as a response packet. The response packet is transmitted back to the transmitting side according to ID routing of the PCI-Express specification of the PCI-Express switch (6). There hardware in the transmitting side receives read data from the response packet, interrupts the transmitting side firmware by writing the data in the memory, and the transmitting side firmware carries out termination processing.

FIG. 3 is a flow diagram explaining sequence of PUT transfer, which writes data at the other end. Routing of the memory write request packet issued from the transmitting side is performed according to address routing of the PCI-Express specification as in the case of a GET transfer. And the receiving side does not make a response according to the PCI-Express specification (response is not generated in the non-posted memory write). For that reason, it was impossible for a requesting side to determine whether the write processing normally performed.

For example, assume a bus number and a device number are set in each port of the PCI-Express switch (6) as described in FIG. 1, and a memory read request packet as a GET transfer performed according to address routing of the PCI-Express specification. The module C transfers read data as a response packet, and the response transfer control is performed according to ID routing of the PCI-Express specification.

FIG. 4 shows a part of a header in the transaction layer of a packet used in the above sequence. The PCI-Express switch (6) performs ID routing of the PCI-Express specification using requester ID in FIG. 4 when, for example, in request ID routing of the response packet, and performs address routing of the PCI-Express specification using address in FIG. 4. The requester ID in FIG. 4 is information for recognizing a module in a requesting side, and the address in FIG. 4 contains routing information to a transfer destination.

As shown in FIG. 5, with such a system, when the module A(1), which is the root complex, is separated, for example, due to an abnormality, such as abnormal voltage, chip defect, software problem, or maintenance, etc., because of the absence of the root complex, according to the PCI-Express specification any of other modules B-N is required to become a new root complex and a change is required in component information (bus numbers/device numbers) of each port that the PCI-Express switch (6) possesses. In an example shown in FIG. 5, after module A(1) separation, the module B(2) is the new route complex with bus-number 0 and device-number 1.

In FIG. 5, suppose (1) a memory read request is issued from the module D(4) to the module C(3), (2) the PCI-Express switch (6) transfers a memory read request packet to the module C(3) according to address routing of the PCI-Express specification, and (3) at that time, the module A(1), which is a root complex, is separated due to abnormality. Then, (4) configure information of each port in the PCI-Express switch (6) is changed, the bus number and the device number are replaced (it may be referred to as ID replacement hereinafter), and the module B(2) becomes the new root complex. (5) The module C(3) responds read data by the memory read request command from the module D(4), and the requester ID at that time, comprises the bus number and the device number of the module D before the replacement. (6) The PCI-Express switch (6), because the packet transmitted from the module C(3) is a response packet, performs routing according to ID routing of the PCI-Express specification. (7) However, because the bus number and the device number are assigned to other modules due to the replacement, the response packet may be transmitted to wrong modules by mistake, or may be lost.

[Patent Document 1]

Japanese Published Patent Application No. 2004-326151

SUMMARY OF THE INVENTION

Problems to be solved by the present invention is to be able to transmit a response packet to a target, which is the original request source node, even if, after issuing request from a node to another, a bus number/a device number is replaced in the PCI-Express switch before said another node makes a response to the request source node in a PCI-Express communication system, which performs communication between nodes using a PCI-Express switch.

In order to solve the problem in the present invention, a unique node ID is set to each module connected by the PCI-Express. Dedicated channels are provided for each of writing data in a module at the other end (PUT transfer), and reading out data from a module at the other end (GET transfer), and a channel ID is set to each channel. The node ID and the channel ID are set in the address of a header of a transferred transaction layer packet according to the PCI-Express, and at the same time, a packet type for identifying whether the packet is a request or a response is set.

For data transfer, only the memory write request packet, being routed according to address routing of the PCI-Express specification, is used.

When a packet is request, the response is always made by a response packet (a response-type memory write request packet).

According to the present invention, because transfer means does not employ the ID routing, even if replacement of a bus number and a device number are caused in the PCI-Express switch, a response can be securely made to a module that issued a request.

A module in the receiving side analyzes the transmitted packet header, determines whether the packet is PUT transfer or GET transfer from the channel ID and whether the packet is a request or a response from the packet type, and performs a proper operation.

It is also possible to determine whether the memory write request command is executed in a normal manner or not by adding information to a response-type memory write request packet.

BRIEF DESCRIPTION OF THE DRAWINGS

FIG. 4 is a diagram explaining a configuration of a header of a transaction packet in a conventional PCI-Express communication system;

FIG. 11 is an inner configuration diagram of a DMA chip, according to an embodiment of the present invention;

FIG. 12 is a diagram showing an example of a channel ID, according to an embodiment of the present invention;

FIG. 14 is a diagram explaining operations of a transmitting channel in the PUT transfer, according to an embodiment of the present invention;

DESCRIPTION OF THE PREFERRED EMBODIMENT

In the following description, details of the preferred embodiment of the present invention are set forthwith reference to FIG. 6-FIG. 9.

Figure 5:
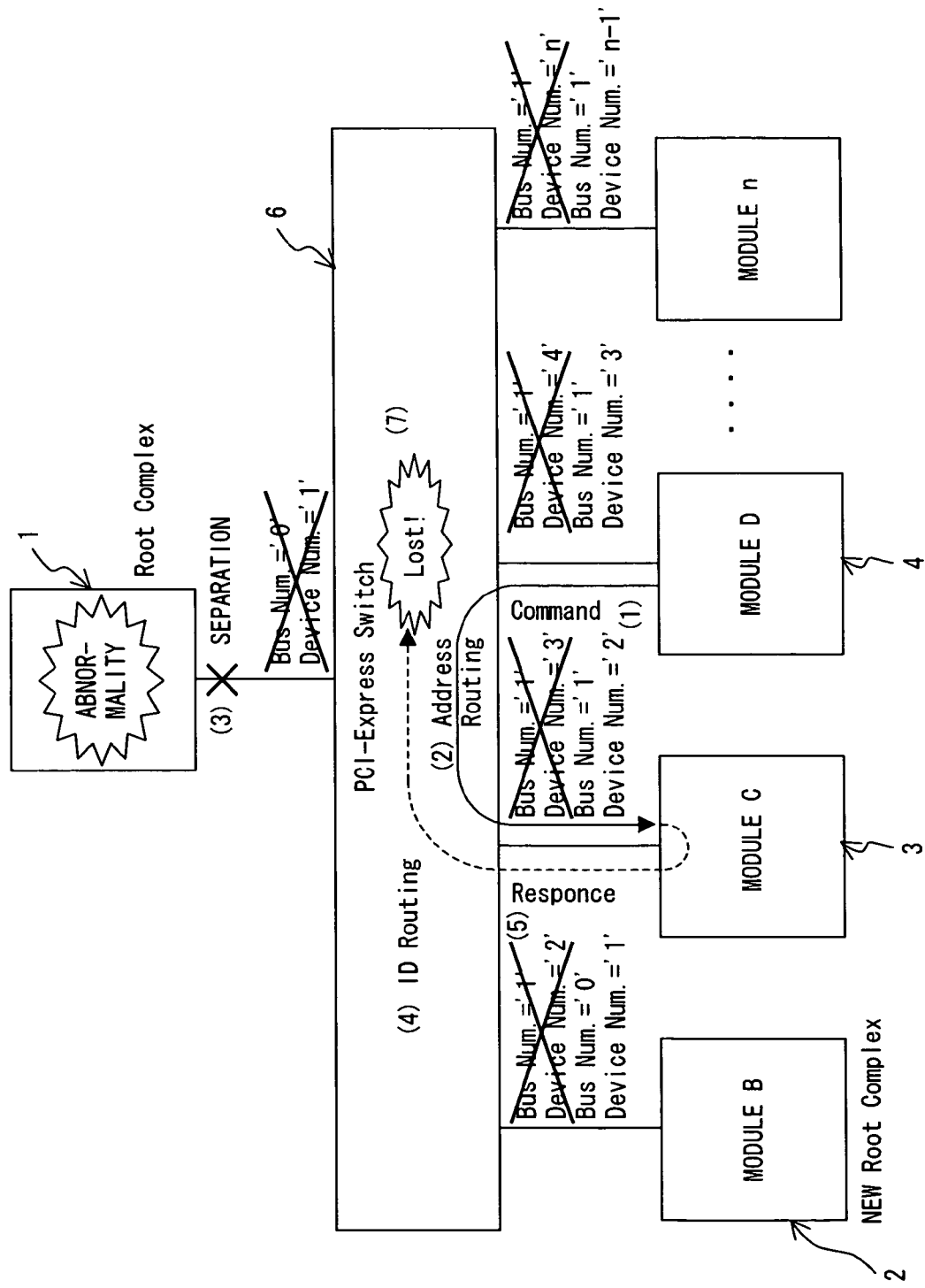
FIG. 5 is a flow diagram of a failure during a GET transfer in a conventional PCI-Express communication system.
Figure 6:
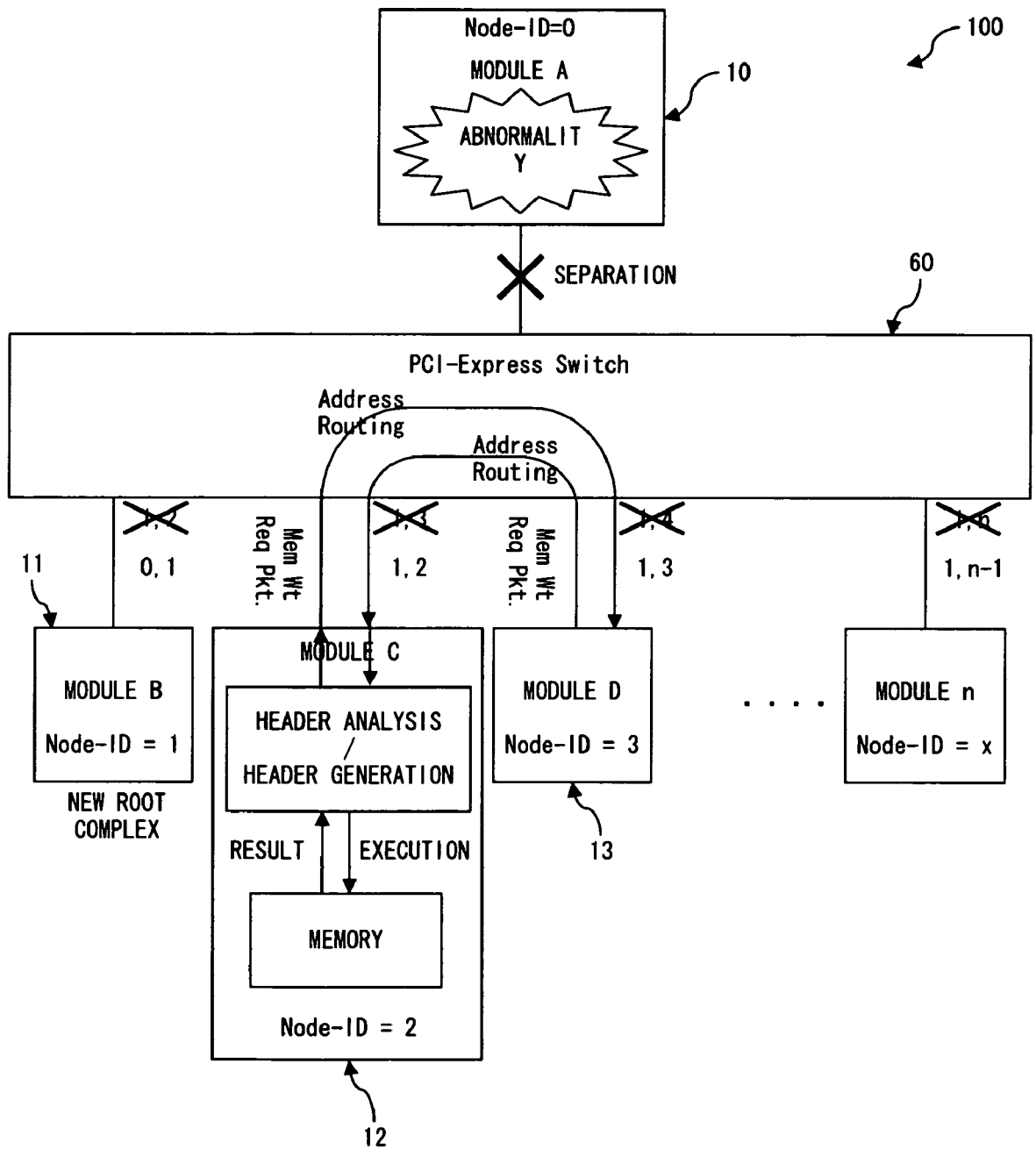
FIG. 6 is a flow diagram explaining failure during a GET transfer in a PCI-Express communication system, according to an embodiment of the present invention.

An example in the PCI-Express communication system (100) of the present invention described in FIG. 6, is in the same state as an example in the conventional PCI-Express communication system described in FIG. 5. In other words, as in the case of FIG. 5, a memory read request, semantically, is issued from the module D(13) to the module C(12), at the timing when the module C(12) tries to return read data to the module D(13) in response, ID renumbering is caused by an abnormality of the module A(10), and a bus number and a device number of the module D(13) are changed from 1,4 respectively to 1,3 respectively, as in the case of the example in FIG. 5.

In the present invention, only the memory write request packet routed in accordance with the address routing of the PCI-Express specification is used for data transfer. Therefore, even if it is semantically a memory read request, a memory write request packet is used.

In the present invention, a unique node ID is set for each module connected to the PCI-Express. In an example of FIG. 6, a module A(10) is assigned the node ID=0, for a module B(11), a module C(12) and a module D(13), node IDs of 1, 2, and 3, respectively, are fixedly assigned.

In addition, dedicated channels are provided for PUT transfers for writing data to a module at the other end, and for GET transfers for reading out data from a module at the other end, and a channel ID is set for each channel.

Figure 7:
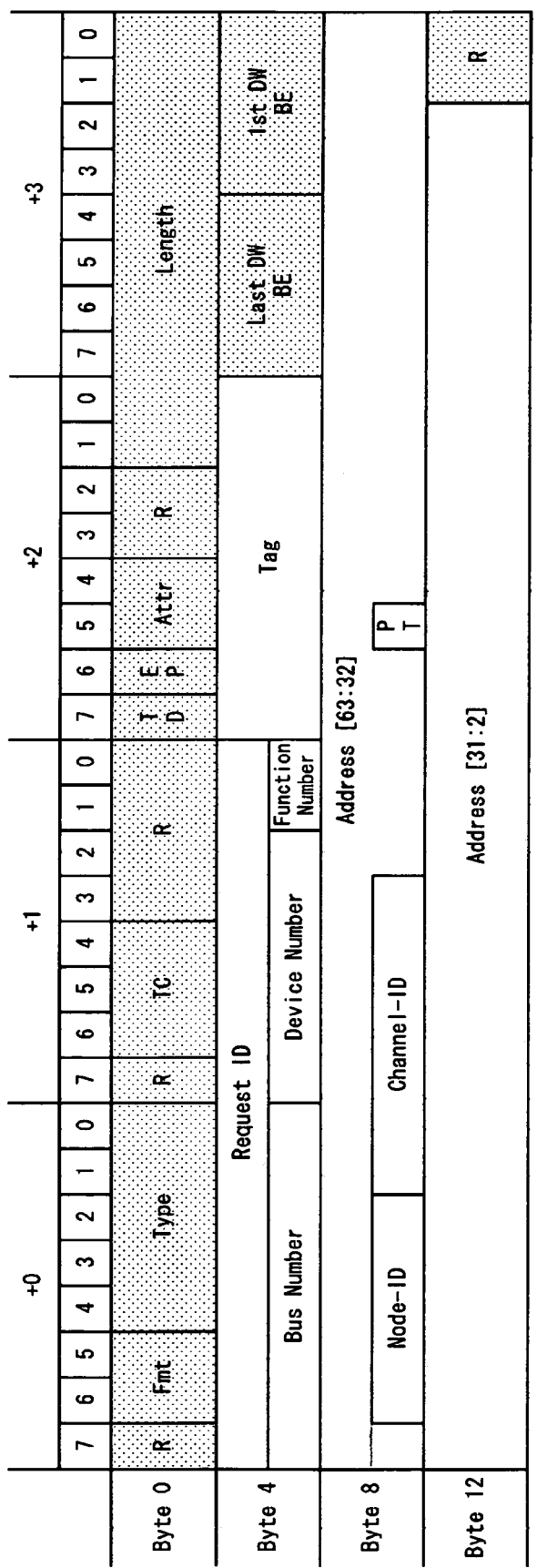
FIG. 7 is a diagram explaining a part of a header of a transaction packet in a PCI-Express communication system, according to an embodiment of the present invention.

FIG. 7 shows a configuration of a header field of the transaction layer packet used in the present invention. The shaded region is not explained as it is not related to the present invention.

As shown in FIG. 7, the node ID (bit [62:58]), the channel ID (bit ([57:51]) and additionally, a packet type PT (bit [46]) are set in an address field (bit [63:2]). The node ID is the ID of the transfer destination of a packet. The channel designated by a channel ID is, as explained in detail later, assigned as a transmitting channel and a receiving channel for each PUT transfer and GET transfer. Therefore, a channel ID of the reception channel of GET transfer is set for a memory read request, and a channel ID of the reception channel of PUT transfer is set for a memory write request. A packet type PT designates a type (0 or 1), which indicates whether a packet is a request or a response.

A channel ID of the packet transfer source is set to the tag field, and when the transfer destination responds with a response packet, the tag field is used as a channel ID of the response destination, in an address field of the response packet.

Figure 8:
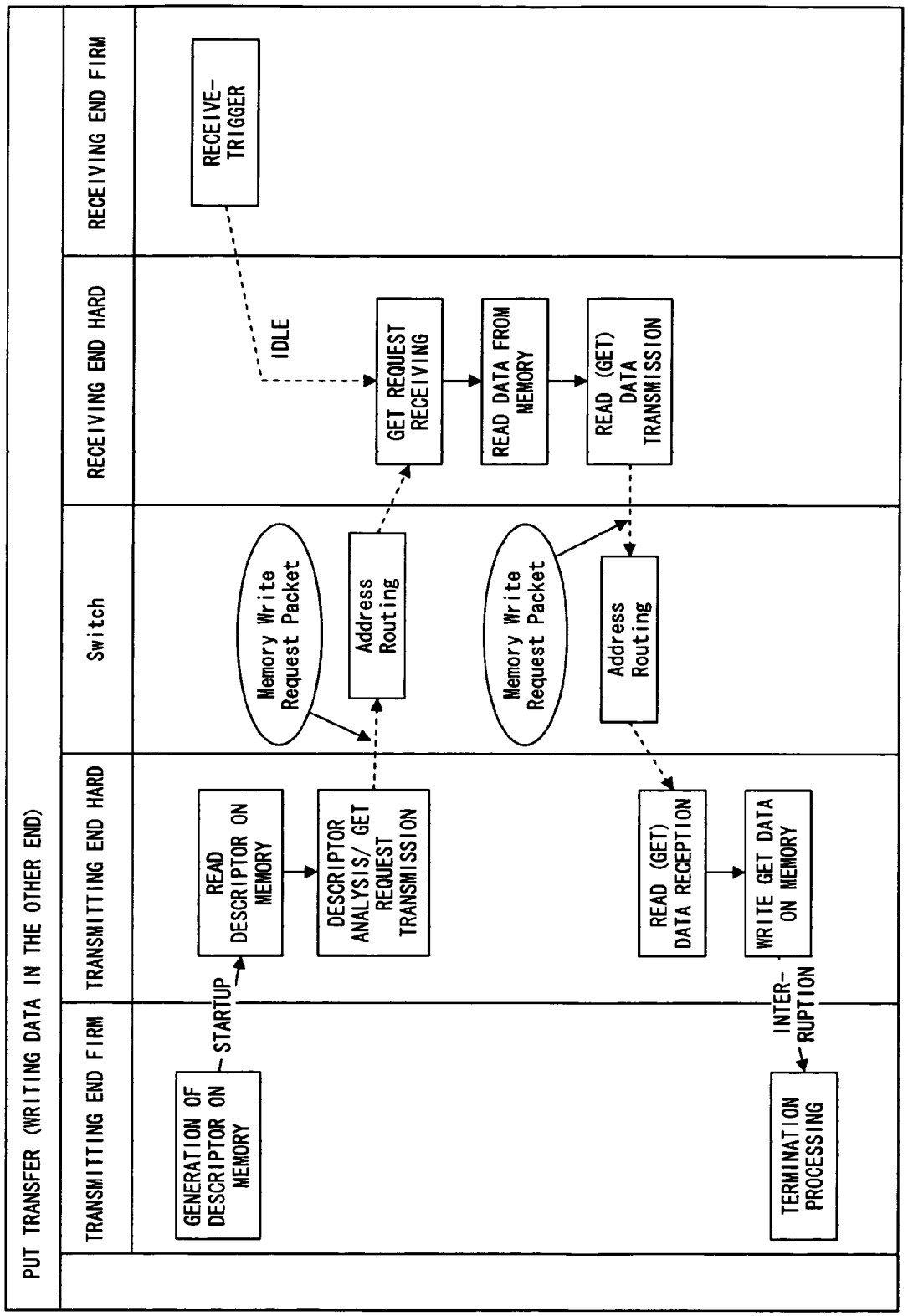
FIG. 8 is a flow diagram of a GET transfer sequence on a PCI-Express communication system, according to embodiment of the present invention.

In the following description, a GET transfer sequence of the present invention for executing a memory read request is explained with reference to FIG. 8.

Figure 1:
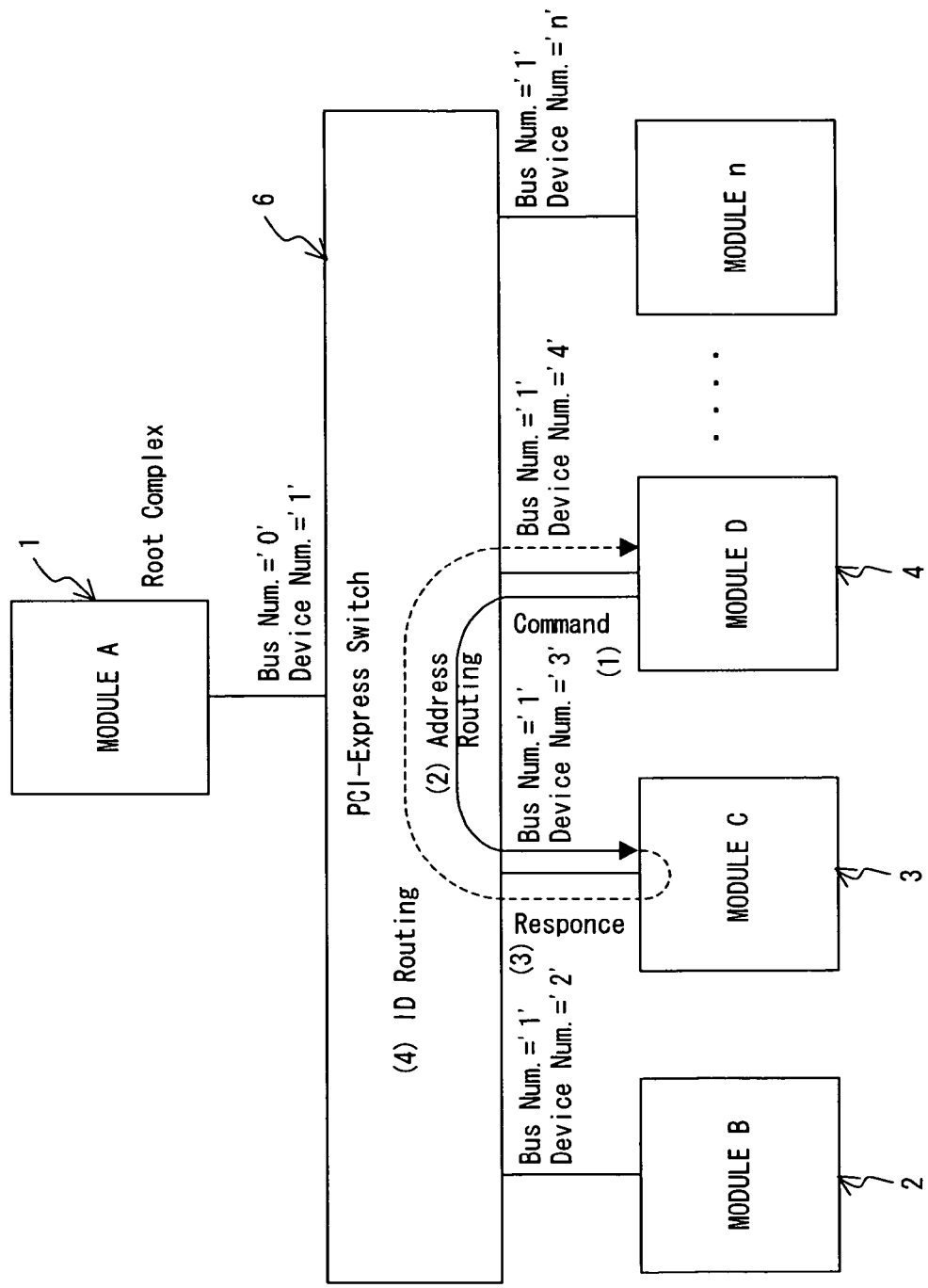
FIG. 1 is a diagram explaining a conventional PCI-Express communication system.
Figure 2:
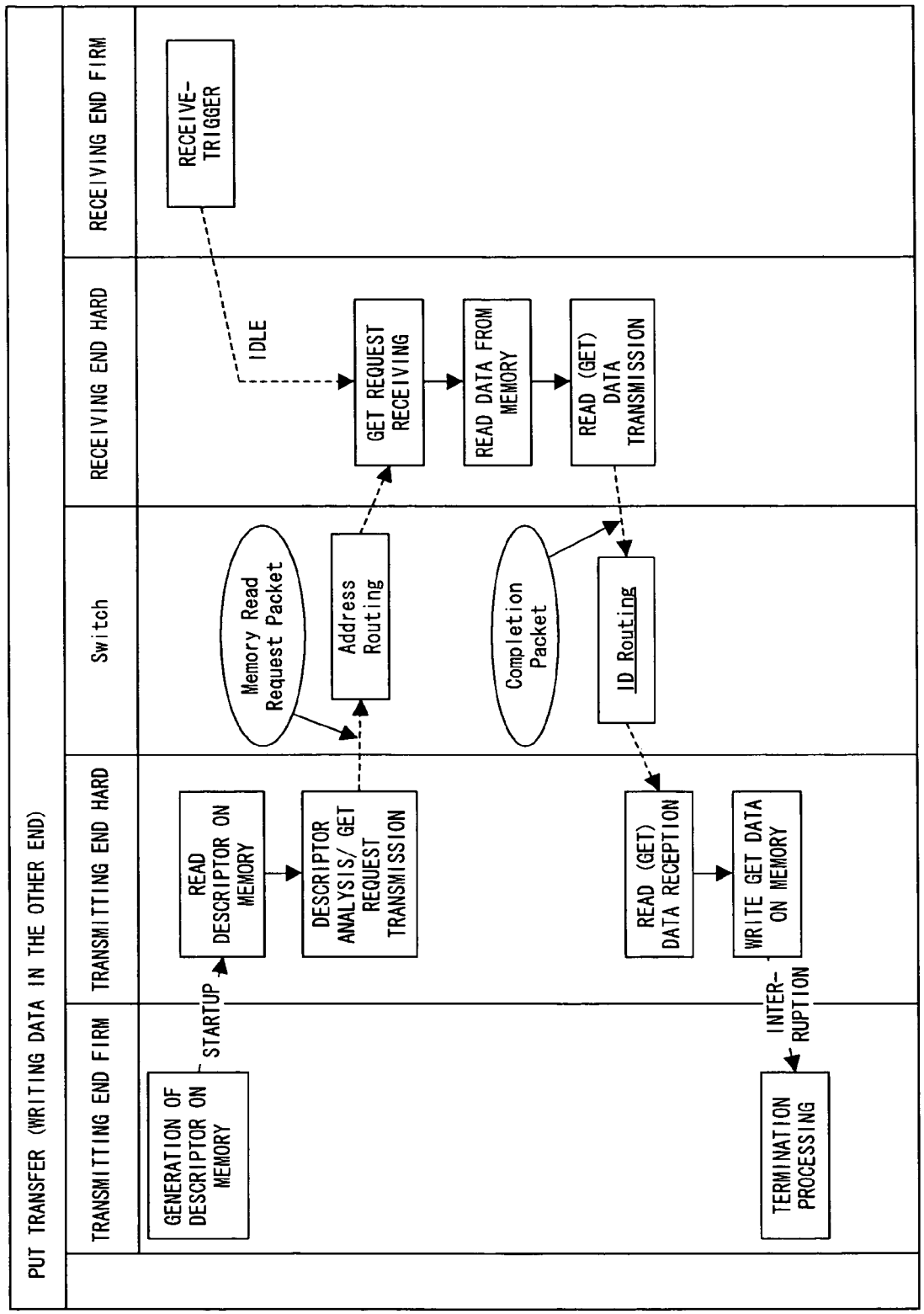
FIG. 2 is a flow diagram explaining a GET transfer sequence in a conventional PCI-Express communication system.

This sequence is the same as that of the conventional example shown in FIG. 2 as far as the operation of the transmitting side analyzing a descriptor and performing a GET transfer request. However, there are some differences when the transmitted packet is a memory write request packet, and is not a memory read request packet, where a node ID, a channel ID and a packet type PT are set in the address field of a packet as explained before, and where a channel ID of the packet transfer source is set in the tag field. A PCI-Express switch transmits a packet to a receiving side while routing a packet according to an address routing of the PCI-Express specification as in the conventional examples.

The receiving side identifies the packet as a request packet from the packet type, and determines that the GET transfer reception channel is used from the channel ID, identifying the packet as a GET transfer. Subsequent, steps of reading out data from memory, and transmitting read out data are the same as those of the conventional example described in FIG. 2. There is a difference in that the transmitted packet is a memory write request packet, and is not a response packet. However, in this case, the packet type is set as a response in the header of the memory write request packet. A request transmitting side module is identified from a requester ID of a previously received memory write request packet, the corresponding node ID is set as a destination. A channel ID set to the tag field is used for the channel ID. Although the packet is semantically a response, the PCI-Express switch identifies the packet as a request packet, and therefore, it transmits a packet to a transmitting side while routing the packet according to the address routing of the PCI-Express specification.

The transmitting side identifies that the packet type is a response and that the packet is a response to a GET request from the GET transfer transmitting channel ID included in the address field, and terminates the process after writing the read data to memory.

Figure 9:
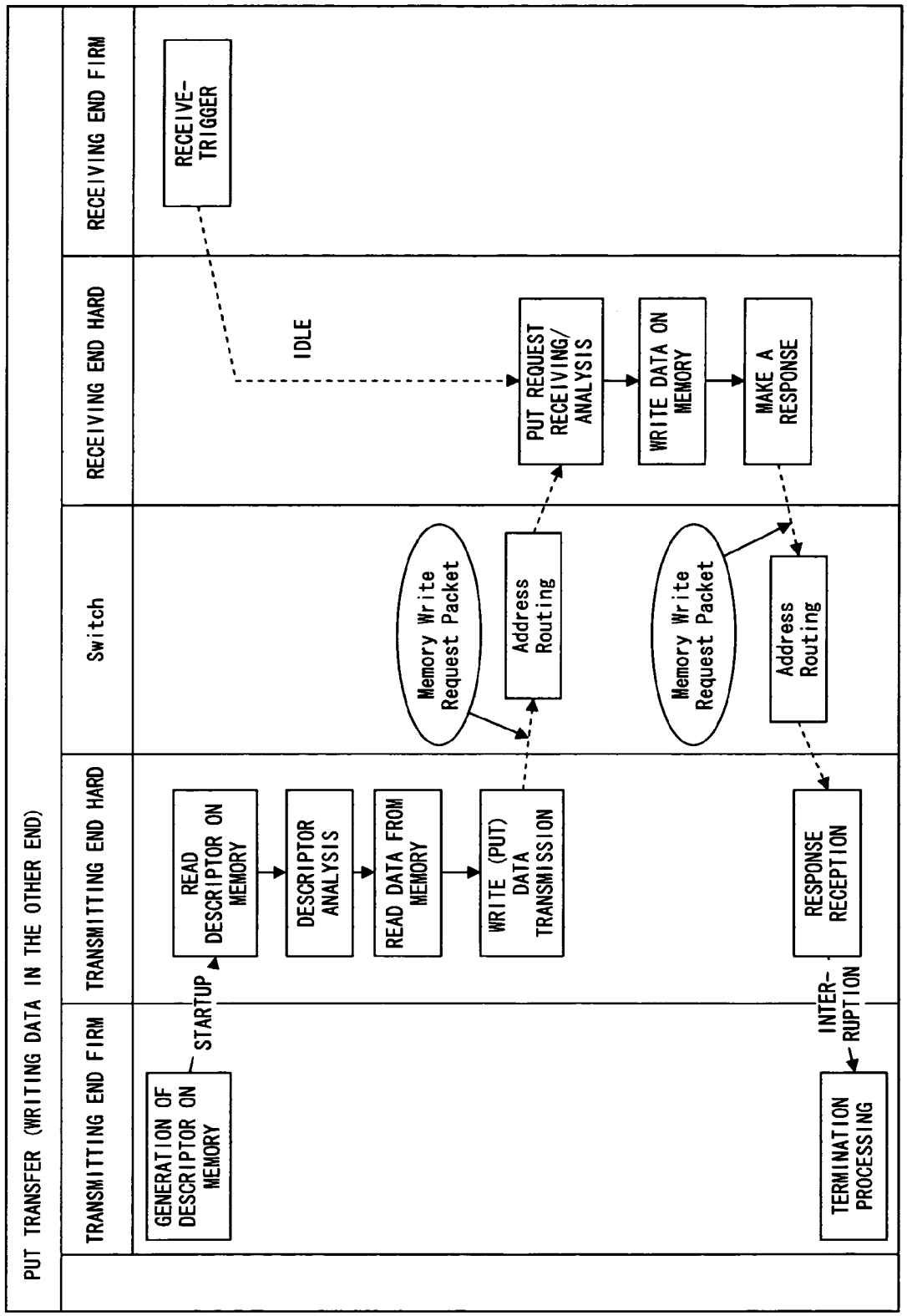
FIG. 9 is a flow diagram explaining a PUT transfer sequence in a PCI-Express communication system, according to an embodiment of the present invention.

Next, a PUT transfer sequence of the present invention for performing a memory write request is explained with reference to FIG. 9.

Figure 3:
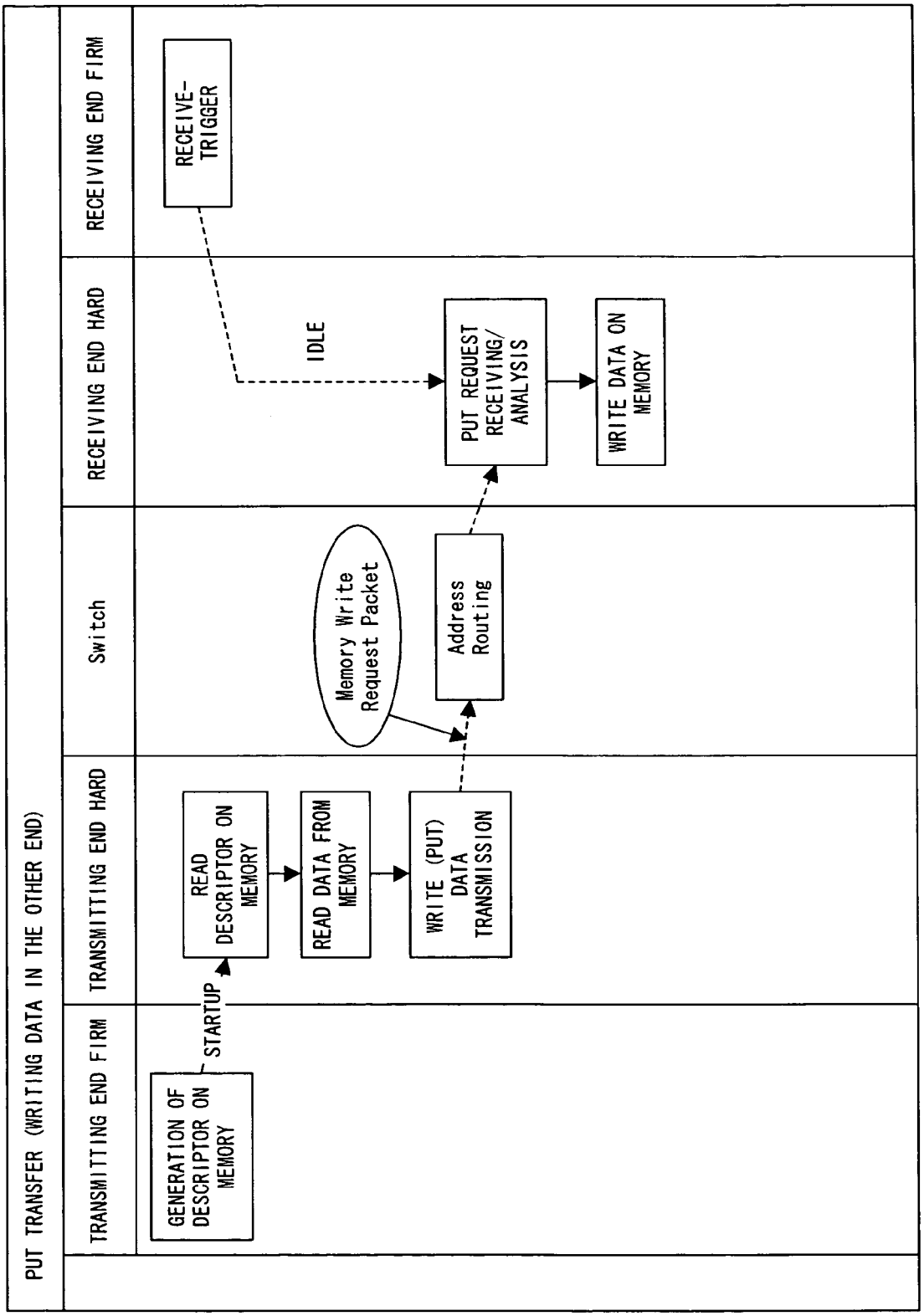
FIG. 3 is a flow diagram explaining a PUT transfer sequence in a conventional PCI-Express communication system.

This sequence is the same as that of the conventional example shown in FIG. 3 until the transmitting side transmits a memory write request packet after analyzing a descriptor and makes a PUT transfer request, except for the settings in the address field and the tag field. The PCI-Express switch transmits a packet while routing the packet according to the address routing of the PCI-Express specification as in the conventional example.

The receiving side identifies the packet as a request packet from the packet type, and determines that PUT transfer reception channel is used from the channel ID, identifying the packet as a PUT transfer. Then the receiving side writes the transmitted data to memory.

Up until this step, the sequence is the same as that of a conventional PUT transfer; however, in the present invention, a function to respond with a response packet using a memory write request packet is incorporated into the hardware, for example. Because the PCI-Express switch replies to the transmitting side with a memory write request packet of which a packet type is set as a response, it identifies the packet as a request packet, and transfers the packet to the transmitting side while routing a packet according to the address routing of the PCI-Express specification. However, because the address field of the received packet contains a PUT transfer transmitting channel ID, the transmitting side can identify the packet as a response to the memory write request made by its own node.

Next, the embodiments of the present invention are explained with reference to FIG. 10-FIG. 18.

In the present embodiments, a DMA chip in a central control module CM realizes the communication method of the present invention in a PCI-Express communication system (200) in which up to eight central control modules CM for controlling all operations of each subsystem perform intercommunication via a PCI-Express switch.

Figure 10:
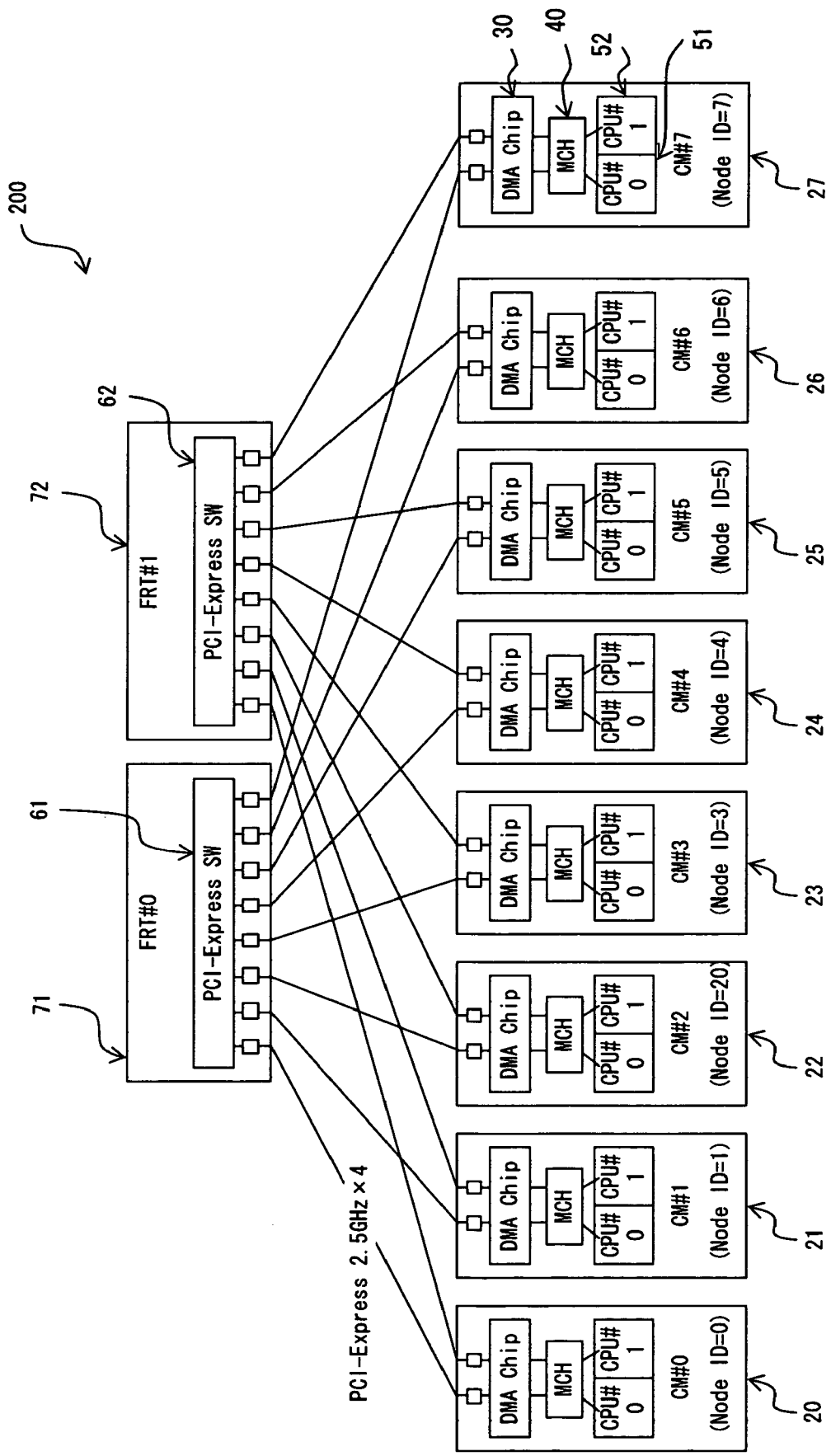
FIG. 10 is a system configuration diagram, according to an embodiment of the present invention.

The system configuration of the present embodiment shown in FIG. 10 is a communication system comprising eight central control modules CM#0(20)-CM#7(27) for controlling all operations in each subsystem and two front end routers FRT#0 (71) and FRT#1(72), and the central control module nodes are connected via the PCI-Express switches (61 and 62) of the front end routers.

Node ID=0 through 7 are assigned in order from CM#0 to central control module nodes. A central control module comprises, as shown in FIG. 10, duplicated CPU#0(51) and CPU#1(52), a DMA chip (30) for offering a communication method between the central control module nodes, and a memory control hub MCH (40) for controling data transfer between the DMA chip (30) and the CPU#0 (51), the CPU#1 (52) and memory, not shown in FIG. 10.

The front end router FRT#0 (71) and FRT#1 (72) constitutes duplicated front end routers. Each of the front end routers FRT#0(71) and FRT#1(72), and each of the central control modules CM#0-CM#7 is connected by four PCI-Express 2.5 GHz lines as shown in FIG. 10.

FIG. 11 describes an internal configuration of a DMA chip (30).

As shown in FIG. 11, the DMA chip (30) comprises a PCI-Express interface control unit (311) at the south port that is located on a PCI-Express switch side, and a PCI-Express interface control unit (312) at the north port that is located on a CPU side. It also comprises a packet control unit (321) and a packet control unit (322) corresponding to each of the PCI-Express interface control unit (311) and the PCI-Express interface control unit (312), respectively. It additionally comprises a message-receiving channel (331), a PUT receiving channel (341), a GET receiving channel (351), transfer buffers (361, 370, 362), a message-transmitting channel (332), a PUT receiving channel (342), and a GET transmitting channel (352).

There are two channels of the message-receiving channel (331), eight channels of the message transmitting channel (332), five channels of the PUT transmitting channel (342), four channels of the GET transmitting channel (352), and one channel is provided for each of the PUT receiving channel (341) and the GET receiving channel (351).

The transfer buffer (361) is used for data transfer from the south port side to the north port side, and the transfer buffer (362) is used for data transfer from the north port side to the south port side. The transfer buffer (370) is used for loop back from the north port side.

A solid line represents a control line (REQ), which indicates a direction of a request notification, a dotted line represents a control line (CMP), which indicates a direction of a request completion notification, and a bold line represents a data line. An outlined arrow represents a PCI-header line, and lines TX and RX connected to the PCI-Express interface control units (311 and 312) represent PCI-Express transmission and reception lines.

In the example shown in FIG. 11, the north port side also employs the PCI-Express; however, the north port side is not necessarily required to employ the PCI-Express because the present invention is applied to the south port side.

FIG. 12 shows an example of the channel ID of the channels shown in FIG. 11. As explained previously, only one of the PUT receiving channel (341) and the GET receiving channel (351) are present physically; however, when the transmitting source transmits a series of packets sequentially, the channel IDs shown in FIG. 12 are employed sequentially for identifying the order of the packets.

In the following description, an example of data transfer in the present embodiments is explained. Some descriptions are the same as the description in FIG. 8 and FIG. 9 and those descriptions are omitted to avoid redundancy.

Figure 13:
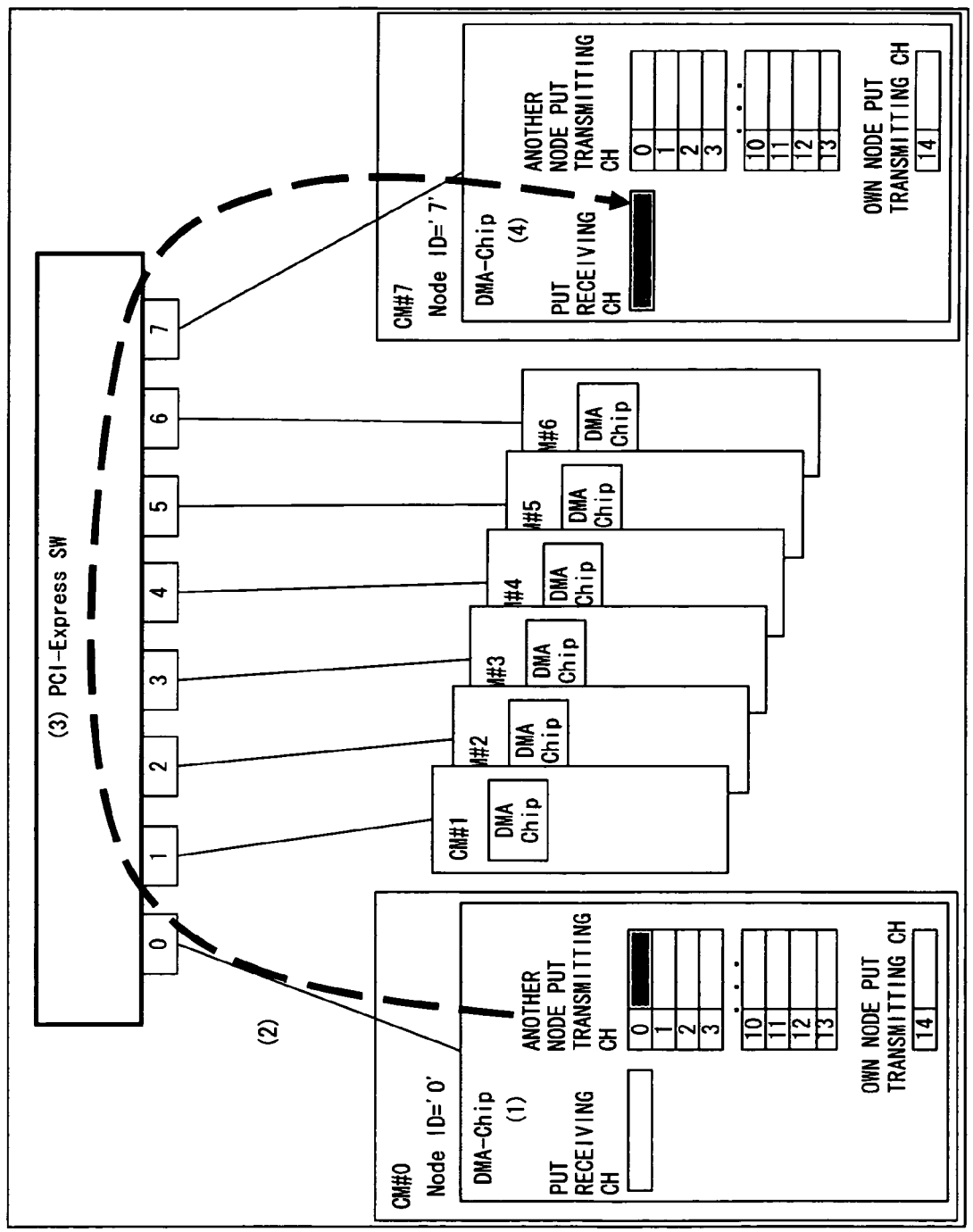
FIG. 13 is a diagram explaining a PUT transfer example, according to an embodiment of the present invention.

FIG. 13 is a diagram explaining an example of the PUT transfer from a central control module CM#0 with the node ID 0 to the central control module CM#7 with the node ID 7. Here, the operations on the response side are the same as the operations explained in FIG. 9, and therefore, the description is omitted.

(1) The CPU of the central control module CM#0 instructs the PUT transmitting channel of a DMA chip to start a PUT transfer. (2) The DMA chip of the central control module CM#0 converts the bit [62:85] (the node ID field) in the address field of the transmitting packet header to 7, which is the node ID of the central control module CM#7, transfers data to the south port side, and then, transmits it as a memory write request packet. (3) The PCI-Express switch analyzes a transmitting destination address, and transfers a packet to the corresponding address. (4) The DMA chip of the central control module CM#7 receives the packet from the south port side, confirms the correspondence between the node ID in the packet and the its own node ID, and informs the PUT receiving channel of the reception of the packet.

Next, with reference to FIG. 14, the operation of the transmitting side channel in the above PUT transfer example is explained. A bold arrow in FIG. 14 indicates an operation where the DMA chip becomes a master, and a solid line arrow indicates an operation where the CPU becomes the master. An arrow with a dotted line indicates an interrupt.

(1) The CPU creates a descriptor for a PUT transfer, and writes it to a descriptor area in the memory. Fifteen 32-byte areas are provided in the example shown in FIG. 14. (2) The CPU instructs the DMA chip to start the PUT transfer. (3) The DMA chip reads out descriptor data from the descriptor area in the memory. (4) The DMA chip analyzes the descriptor and reads out data from the data area which the address designates as the transmitting source of the memory. (5) The DMA chip transfers the read data to the south port side, waits for a completion notice from the DMA chip of the transfer destination, and receives a response from the other end. (6) The DMA chip updates a completion pointer of the descriptor, and writes a pointer value (a descriptor termination pointer) to a descriptor termination pointer area on the memory. (7) The DMA chip interrupts the CPU in order to notify the CPU of the transfer termination. (8) The CPU releases the interrupt and clears a termination code as a fixing operation of the termination pointer.

Figure 15:
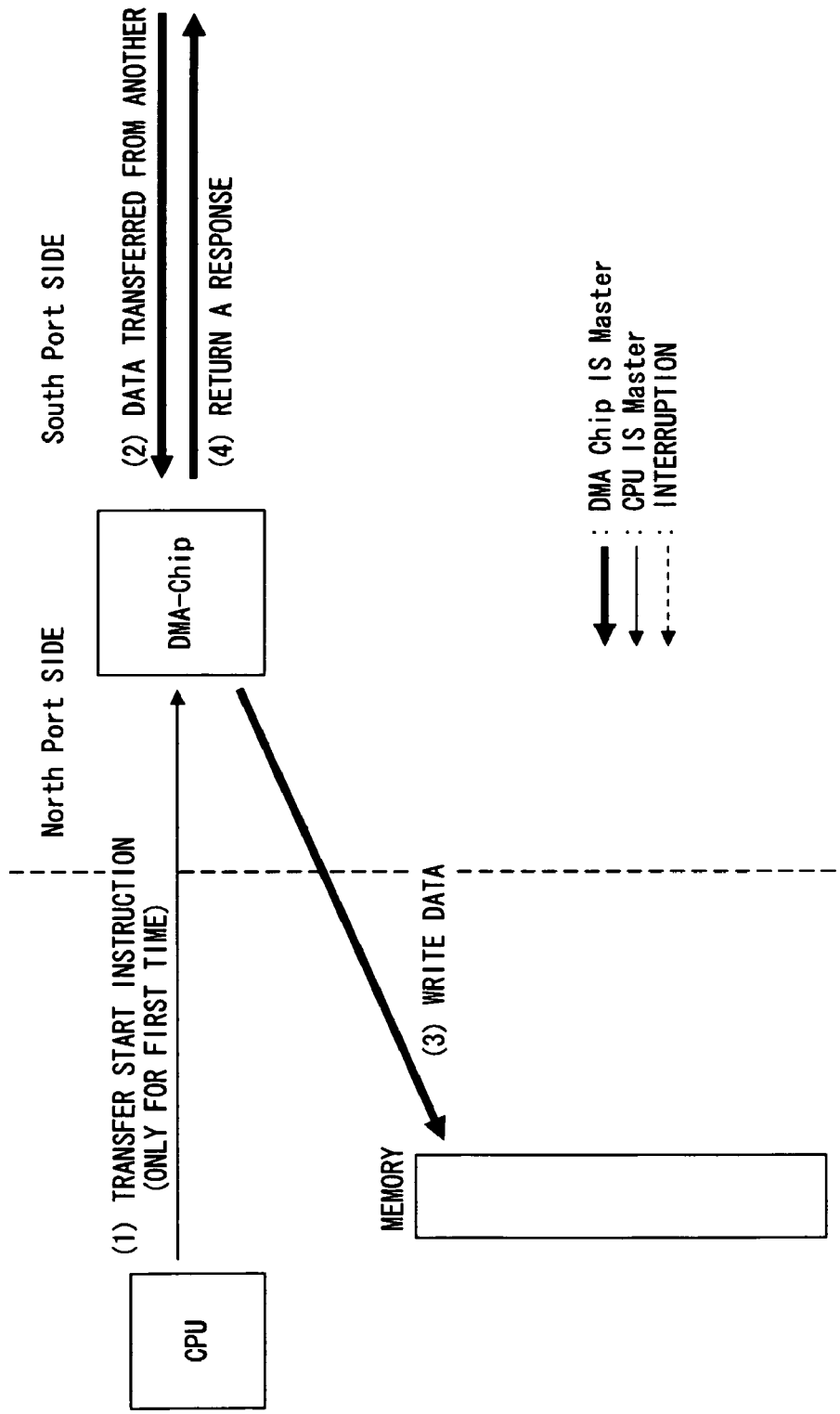
FIG. 15 is a diagram explaining operations of a receiving channel in the PUT transfer, according to an embodiment of the present invention.

Next, the operation of the receiving channel in the above PUT transfer example is explained with reference to FIG. 15.

(1) The CPU activates the PUT receiving channel, and instructs the DMA chip to start the transfer. (Only performed the first time) (2) The DMA chip receives data from the south port side. (3) The DMA chip transfers the received data to the north port side and writes the data to the memory. (4) The DMA chip returns a response packet to the south port side.

Figure 16:
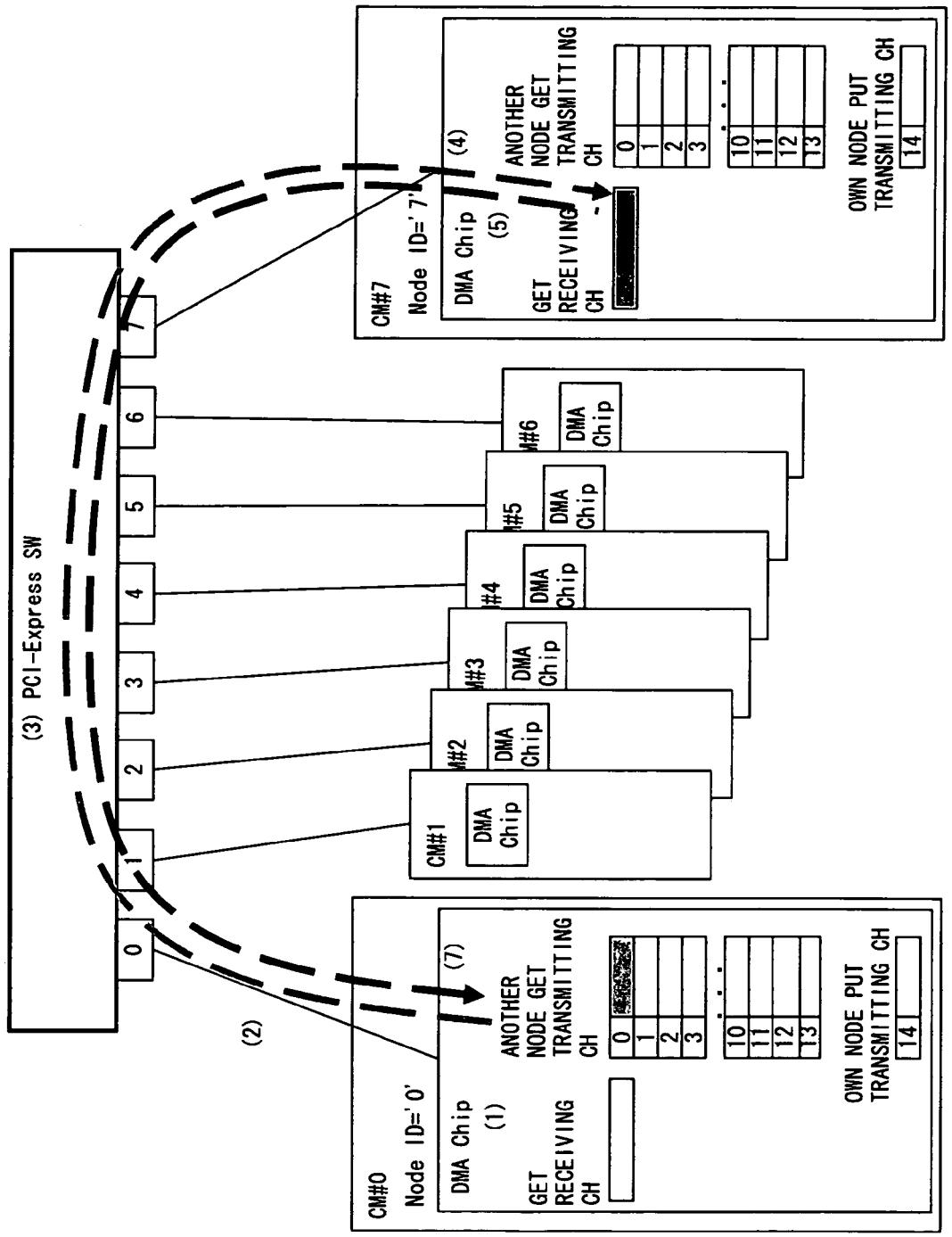
FIG. 16 is a diagram explaining a GET transfer example, according to an embodiment of the present invention.

FIG. 16 is a diagram explaining an example of a GET transfer from the central control module CM#0 with the node ID 0 to the central control module CM#7 with the node ID 7.

(1) The CPU of the central control module CM#0 instructs the GET transmitting channel of the DMA chip to start the GET transfer. (2) The DMA chip of the central control module CM#0 converts the bit [62:85] (the node ID field) in the address field of the transmitting packet header to 7, which is the node ID of the central control module CM#7, transfers data to the south port side, and then, transmits it as a memory write request packet. (3) The PCI-Express switch analyzes a transmitting destination address, and transfers a packet to the corresponding address. (4) The DMA chip of the central control module CM#7 receives the packet from the south port side, confirms the correspondence between the node ID in the packet and its own node ID, and informs the GET receiving channel of the confirmation. (5) The DMA chip of the central control module CM#7 reads out data from the memory of its own central control module, transfers the data to the south port side, and transmits the data as a memory write request packet. (6) The PCI-Express switch analyzes the transmitting destination address, and transfers the packet to the corresponding address. (7) The GET transmitting channel in the DMA chip of the central control module CM#0 receives GET data from the south port side, and transfers the data to the north port side.

Figure 17:
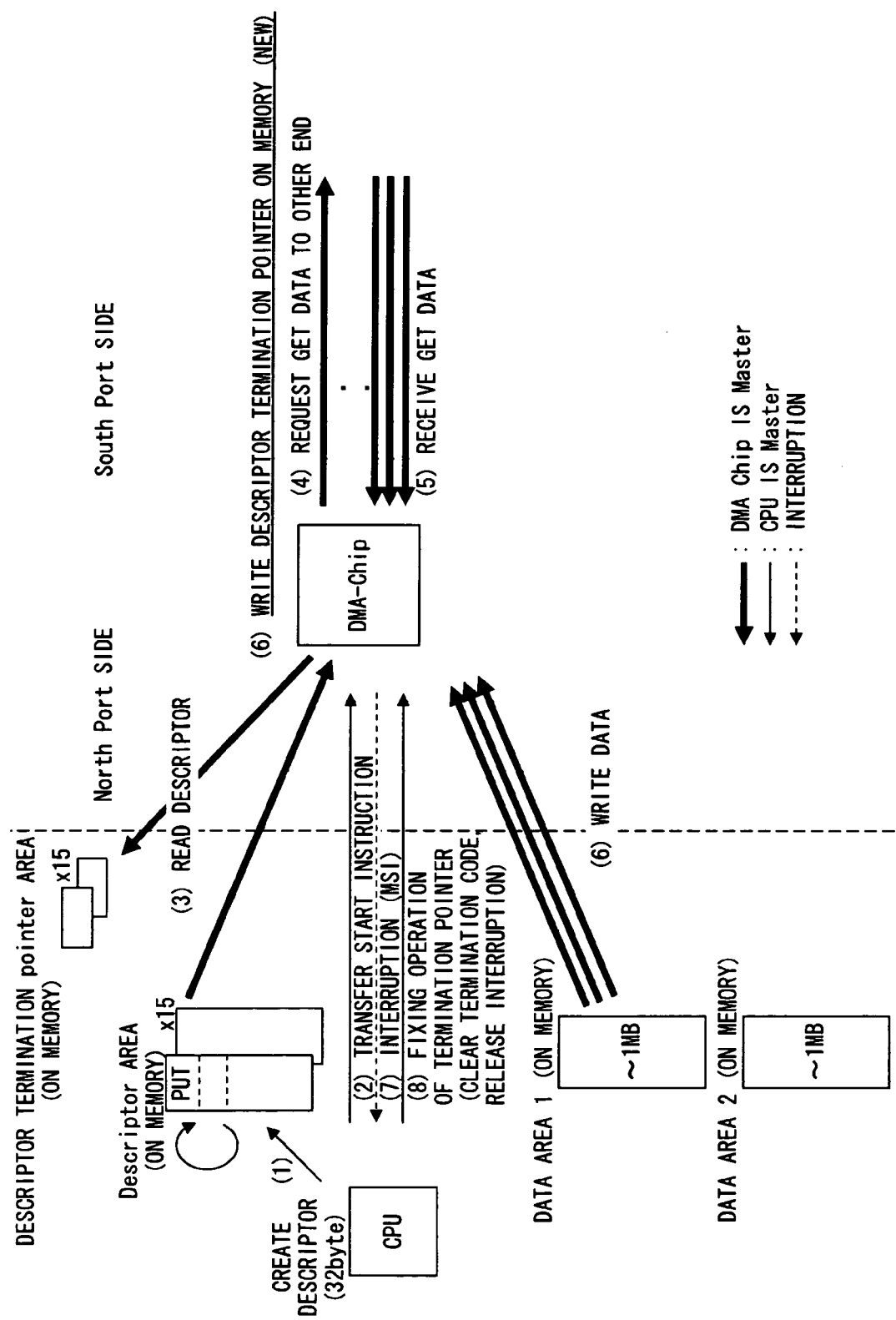
FIG. 17 is a diagram explaining operations of a transmitting channel in the GET transfer, according to an embodiment of the present invention.

Next, the operation of the transmitting side channel in the above GET transfer example is explained with reference to FIG. 17.

(1) The CPU creates a descriptor for a GET transfer, and writes it to a descriptor area in the memory. (2) The CPU instructs the DMA chip to start the GET transfer. (3) The DMA chip reads out descriptor data from the descriptor area in the memory. (4) The DMA chip analyzes the descriptor and makes a GET data request to the DMA chip at the other end. (5) The DMA chip receives the GET data from the south port side, and transfers the data to the north port. (6) The DMA chip updates a completion pointer of the descriptor, and writes a pointer value (a descriptor termination pointer) to a descriptor termination pointer area in the memory. (7) The DMA chip interrupts the CPU in order to notify the CPU of the transfer termination. (8) The CPU releases the interruption and clears a termination code as a fixing operation of the termination pointer.

Figure 18:
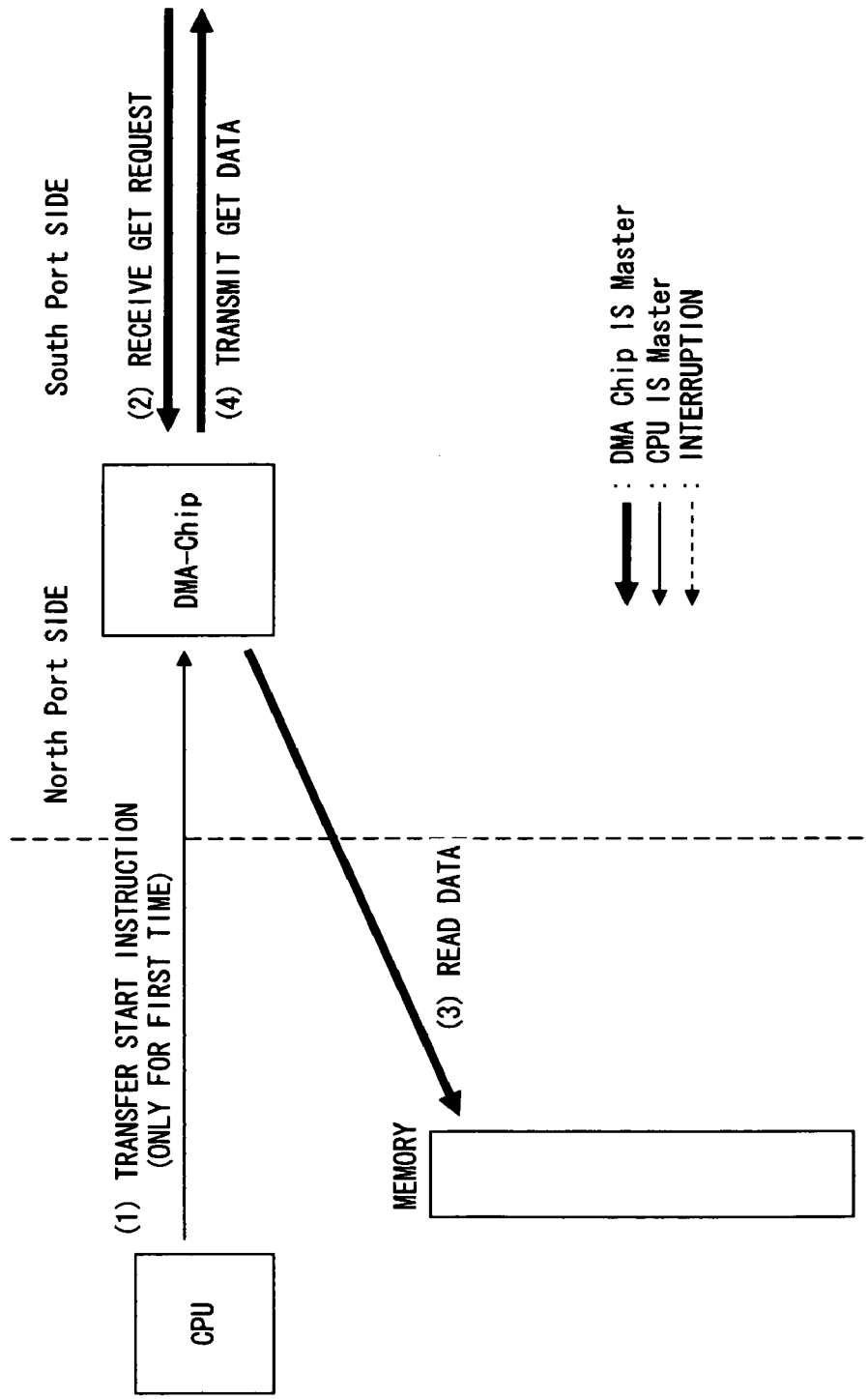
FIG. 18 is a diagram explaining operations of a receiving channel in the GET transfer, according to an embodiment of the present invention.

Next, the operation of the receiving channel in the above PUT transfer example is explained with reference to FIG. 18.

(1) The CPU activates the GET receiving channel, and instructs the DMA chip to start the transfer. (Only performed the first time) (2) The DMA chip receives a GET request from the south port side. (3) The DMA chip reads data from the memory of its own central control module CM. (4) The DMA chip transfers the GET data to the south port side.

As explained above, in the PCI-Express communication system of the present invention, only a memory write request packet routed according to the address routing of the PCI-Express specification is employed for data transfer, and therefore, even in an occurrence of ID replacement due to a route complex failure, a response can be returned in a normal manner.

Also, a response packet can be returned regardless of the operations of the PCI-Express switch or the command types, a command issue source module can securely acquire information regarding whether the data transfer terminated in a normal manner or not.

What is claimed is:

1. A PCI-Express communication system, which uses a PCI-Express switch carrying out packet transfer by connecting a plurality of modules, comprising:
    setting a unique node ID for each of a plurality of the modules for indicating each module, as well as setting a channel ID for each channel used for data transfer;
    setting in an address field of a packet for data transfer, the node ID of a transfer destination module, the channel ID of the channel used for the data transfer, and a packet type to indicate whether the packet is a request or a response type packet;
    using a memory write request packet to be routed according to a PCI-Express switch address routing for the data transfer, and
    as channels used for the data transfer, providing a PUT transfer dedicated channel for writing data in a module at the other end and a GET transfer dedicated channel for reading data from a module at the other end.

2. The PCI-Express communication system according to claim 1, wherein when issuing a memory read from one module to another module, said one module sets in an address field of the memory write request packet, the node ID of said another module, the channel ID of the GET transfer dedicated channel used by said another module, and the packet type indicating a request.

3. The PCI-Express communication system according to claim 1, wherein when issuing a memory write request from one module to another module, said one module sets in an address field of the memory write request packet, the node ID of said another module, the channel ID of the PUT transfer dedicated channel used by said another module, and the packet type indicating a request.

4. The PCI-Express communication system according to claim 1, wherein each of the PUT dedicated channels and the GET dedicated channels comprises a receiving channel and a transmitting channel.

5. The PCI-Express communication system according to claim 2, wherein, said one module sets the channel ID of the GET transfer dedicated channel used by said one module, and said another module sets the channel ID, the node ID of said one module, and the packet type indicating a response to an address field of a header of a memory write packet, and sends the memory write request packet back to said one module.

6. The PCI-Express communication system according to claim 3, wherein, said one module sets the channel ID of the PUT transfer dedicated channel used by said one module in the header of the memory write request packet, and said another module sets the channel ID, the node ID of said one module, and the packet type indicating a response to an address field of a header of a memory write request packet, and sends the memory write request packet back to said one module.

7. The PCI-Express communication system according to claim 4, wherein, when issuing a memory read request from one module to another module, said one module sets to the address field of the memory write request packet, the node ID of said another module, the channel ID of the GET transfer dedicated receiving channel of said another module, and the packet type for indicating a request and to the header of the memory write request packet, the channel ID of the GET transfer dedicated transmitting channel used by said one module, and said another module sets to the address field of the header of a memory write request packet, the channel ID of the transmitting channel, the node ID of said one module and the packet type to indicate a response, and replies to said one module with the memory write request packet.

8. The PCI-Express communication system according to claim 4, wherein, when issuing a memory write request from one module to another module, said one module sets in the address field of the memory write request packet, the node ID of said another module, the channel ID of the PUT transfer dedicated receiving channel of said another module and the packet type indicating a request, and sets in the header of the memory write request packet, the channel ID of the PUT transfer dedicated transmitting channel used by said one module, and said another module sets in the address field of the header of a memory write request packet, the channel ID of the transmitting channel, the node ID of said one module and the packet type indicating a response, and replies to said one module with the memory write request packet.

9. A PCI-Express communication method which uses a PCI-ExDress switch carrying out packet transfer by connecting a plurality of modules, comprising:
    setting a unique node ID to each of a Dlurality of the modules for indicating every module, as well as setting a channel ID to each channel used for data transfer;
    setting in an address field of a packet for data transfer, the node ID of a transfer destination module, the channel ID of the channel used for the data transfer, and packet type to indicate a request or a response type packet;
    responding with a response packet when the packet type is a request;
    using a memory write request packet to be routed according to PCI-Express switch address routing for the data transfer, and
    as channels used for the data transfer, providing a PUT transfer dedicated channel for writing data in a module at the other end and a GET transfer dedicated channel for reading data from a module at the other end.

10. The PCI-Express communication method according to claim 9, wherein when issuing a memory read request from one module to another module, said one module sets in an address field of the memory write request packet, the node ID of said another module, the channel ID of the GET transfer dedicated channel used by said another module, and the packet type indicating a request.

11. The PCI-Express communication method according to claim 9, wherein when issuing a memory write request from one module to another module, said one module sets in an address field of the memory write request packet, the node ID of said another module, the channel ID of the PUT transfer dedicated channel used by said another module, and the packet type indicating a request.

12. The PCI-Express communication method according to claim 10, wherein, said one module sets the channel ID of the GET transfer dedicated channel used by said one module, and said another module sets in the address field of the header of a memory write request packet, the channel ID, the node ID of said one module, and the packet type indicating a response, and replies to said one module with the memory write request packet.

13. The PCI-Express communication method according to claim 11, wherein, said one module sets the channel ID of the PUT transfer dedicated channel used by said one module, and said another module sets in an address field of a header of a memory write request packet, the channel ID, the node ID of said one module, and the packet type indicating a response, and replies to said one module with the memory write request packet.

14. A module of a PCI-Express communication system which uses a PCI-Express switch carrying out packet transfer, comprising:
   setting a unique node ID identifying it from a plurality of the modules of the system, as well as setting a channel ID to each channel used for data transfer;
   setting in an address field of a packet for data transfer, the node ID of a transfer destination module, the channel ID of the channel used for the data transfer, and packet type indicating a request or a response type packet;
   using a memory write request packet to be routed according to PCI-Express switch address routing for the data transfer, and
   as channels used for the data transfer, providing a PUT transfer dedicated channel for writing data in a module at the other end and a GET transfer dedicated channel for reading data from a module at the other end.

15. The module of a PCI-Express communication system according to claim 14, comprising, when issuing a memory read request to a module at the other end, setting in the address field of the memory write request packet, the node ID of the module at the other end, the channel ID of the GET transfer dedicated channel used by the module at the other end, and the packet type indicating a request.

16. The module of a PCI-Express communication system according to claim 14, comprising, when issuing a memory write request to a module at the other end, setting in the address field of the memory write request packet, the node ID of the module at the other end, the channel ID of the PUT transfer dedicated channel used by the module at the other end, and the packet type indicating a request.

17. The module of a PCI-Express according to claim 14, further comprising:
   when receiving a memory write request from a module at the other end,
   setting in the address field of a memory write request packet, the node ID of the module at the other end, the packet type indicating a response; and
   replying to the module at the other end with the memory write request packet.

\* \* \* \* \*